United States Patent [19]
Townsend, Jr. et al.

[11] Patent Number: 5,606,830
[45] Date of Patent: Mar. 4, 1997

[54] COLLAPSIBLE ANTI-BIRD PERCHING DEVICE

[76] Inventors: Charles E. Townsend, Jr., 11 Ranch Rd., Orinda, Calif. 94563; Charles E. Townsend, III, 19 Nottingham Ct., Brentwood, Calif. 94513

[21] Appl. No.: 411,120

[22] Filed: Mar. 27, 1995

[51] Int. Cl.⁶ .................................................. G04H 9/16
[52] U.S. Cl. .......................... 52/101; 52/741.3; 43/1; 256/11; D30/119
[58] Field of Search .............................. 52/101, 741.3; D30/199; 43/1, 58; 256/11

[56] References Cited

U.S. PATENT DOCUMENTS

| | | | |
|---|---|---|---|
| D. 357,771 | 4/1995 | Townsend, III et al. | 256/11 X |
| 1,654,028 | 12/1927 | Wilson et al. | 52/101 X |
| 2,304,593 | 12/1942 | Peles | 52/101 |
| 2,777,171 | 1/1957 | Burnside et al. | 20/1 |

FOREIGN PATENT DOCUMENTS

| | | | |
|---|---|---|---|
| 1059233 | 9/1957 | Germany | 52/101 |

*Primary Examiner*—Carl D. Friedman
*Assistant Examiner*—Aimee E. McTigue
*Attorney, Agent, or Firm*—Townsend and Townsend and Crew

[57] ABSTRACT

An anti-bird perching device which can be installed by draping over railings, water pipes, wire cables or the like, either as a permanent or temporary barrier or deterrent for keeping both small and large birds from landing or perching on the understructure to be protected is described. The device comprises two identical panels made of a wire open rectangular grid fencing which said panels are hingedly attached to one another at spaced horizontal points, and wherein the wire material above the hinge points define two parallel rows of crisscrossing upwardly projecting wire prongs or spikes defining a surface which deters birds from landing or perching thereon. The hinged attachment permits the two-wire panel units to be pulled apart for installation or collapsed tightly together for compact shipping and storage applications. A method of installing multiple barrier units along a span of electric cable, telephone wire or water pipes and the like is also disclosed.

5 Claims, 2 Drawing Sheets

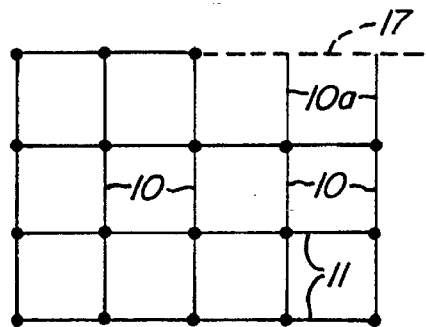 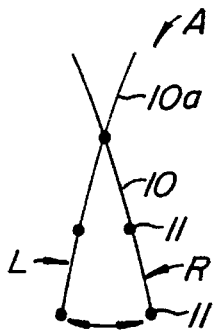 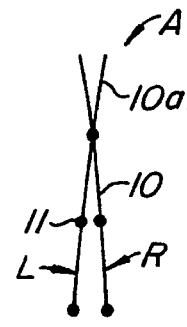
FIG. 4.  FIG. 5a.  FIG. 5b.
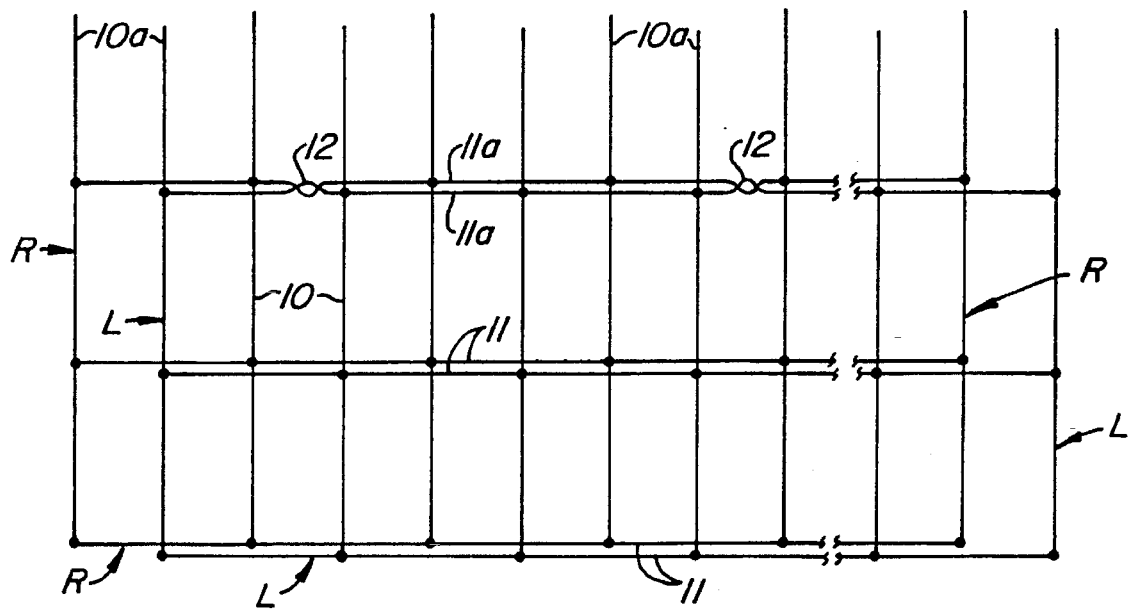
FIG. 6.

COLLAPSIBLE ANTI-BIRD PERCHING DEVICE

BACKGROUND OF THE INVENTION

This invention relates to a new anti-bird perching device and method system which can be installed on flat surfaces, railings, pipes, wire cables or the like either as a permanent or temporary fencing type structure to keep birds from perching with their resultant undesired droppings on the understructure (e.g., ledges, rails, pipes, cables) upon which the barrier unit or units are mounted.

Basically, a device made according to the invention comprise two panels of open grid metal or plastic wire fencing type material consisting of spaced parallel, horizontal and vertical strands defining rectangular grid openings of uniform size. The opposed panel units are hinged together at horizontally spaced points to permit the lower panel sections located below the hinge points to be optionally spread apart or collapsed together. The upper portions of the panels located above the hinge points are defined by horizontally spaced vertical strands with the upper ends of the strands defining unsheathed wire prongs, with the vertical prongs on one panel being horizontally offset midway relative to the wire prong strands of the opposite panel.

When the lower panels are spread apart, the upper offset vertical prongs correspondingly move away from each other leaving a crisscross pattern of wire prongs sticking up with the offset prongs of opposing panels at divergent angles depending the extent to which the lower panels are spread apart at diverging angles.

The assembled units as above described can, by spreading the lower panels apart, be literally draped over a pipe, narrow railing or cable. If desired the draped units can be either permanently or temporarily locked in place by any number of conventional means as will be described.

Additionally, the units can with the lower panels spread apart, be temporarily or permanently anchored to flat ledges or similar surfaces.

DESCRIPTION OF PRIOR ART

The problem of deterring birds of different and many species from perching on buildings, ledges, overhead cables and the like with their resultant droppings on whatever is below is an age-old problem for which many solutions have been tried—some successful and others not. In the past and as of today, different manufacturers and installers utilize singularly or in combination with one another various types of wire-type or plastic barriers (for flat ledges), wire or plastic netting (for large surface area coverage), custom-installed wire prongs on outdoor statutes or sculpted surfaces, and/or soft plastic continuous beads of materials that some birds presumably find undesirable to perch on. There is no one type of known bird barrier that can or should be used in all types of installations. Amongst what might be considered as the more relevant types of prong- or wire-type barriers, reference is made to the disclosures set forth in U.S. Pat. Nos. 2,777,171, 2,546,731, 2,304,593 and 4,962,619. All of the embodiments of bird barriers shown in these references are specifically designed for permanent attachment to flat building surfaces, ledges, fencing or the like. Unlike applicant's invention, none of these references show an anti-perching device that is capable of being rapidly installed either as a temporary or permanent installation on thin or rounded outdoor railings, overhead water pipes, suspended power cables, or cable TV wire cable, and the like.

OBJECTS AND ADVANTAGES OF INVENTION OVER PRIOR ART

A principal advantage of an anti-perching device made according to the invention can be quickly and easily installed by draping the unit over elongate relatively narrow structure including narrow railings, overhead water pipes, suspended electrical per lines or small wire fence or electric cables. The units can be installed as temporary and easily removable and reusable bird barriers, or the same can be quickly and permanently locked in draped position over the substructure.

Another object and advantage of the present invention that the same units can be permanently or temporarily installed on flat surfaces as an effective device for deterring birds from landing or perching thereon. For example, the units can be installed permanently on window or roof ledges of buildings by mechanically or adhesively anchoring them to the substructure, or the units may be used as temporary and easily removable and replaceable barriers when placed around the periphery of flat roofs of parked recreational motor homes, autos or the like.

Units according to the present invention are made to be collapsible so that they can be compactly flat-stacked one on top of the other for economic and efficient shipping and storage until ready for use, whereupon the units can be manually spread apart and draped over a structure or placed in a self-standing position on a flat surface.

The units may be made in any desired, easy-to-handle modular lengths such as 4' long. Any number of units can be installed in end-to-end relationship with the ends of adjacent units preferably being mechanically interlocked to one another, to cover as many linear feet of rounded pipe or wire cable as need be.

The units can be hand-fabricated or produced in quantity by conventional automated equipment out of available standard size galvanized, painted, plastic-covered, or painted wire fencing with virtually no waste or loss of material.

I also teach a novel method of installing multiple, standard-length units (e.g., 4' long) on overhead pipe, electrical power lines or telephone lines suspended from spaced-apart anchoring points (e.g., telephone poles or steel towers) by having an operator located on or adjacent a first tower mount one unit after another from that single location onto the suspended cable and, as each unit is added, mechanically coupling it to its predecessor whereby the first applied unit with its multiple connected units can be towed or pulled with a tow line gradually along the suspended cable by a second operator located on or adjacent the second tower. This method eliminates the necessity of having to continuously elevate and move an operator along the suspended cable so that he can separately and individually install one unit at every 4' interval along the suspended cable.

Numerous other objects and advantages of the invention will become apparent upon reading the following specification and referring to the accompanying drawings in which corresponding parts are numbered similarly in each of the several views.

3

Figure 3:
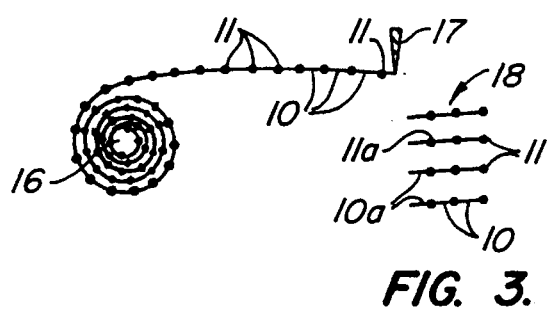

FIG. 3 shows how a row of standard wire grid fencing can be consecutively cut or sheared into uniform lengths of desired configuration in the fabrication process.

FIG. 4 shows diagrammatically the location of the cut or shear line shown in FIG. 3.

FIG. 5a shows diagrammatically two panels hinged together and expanded with the upper vertical spans of wire crisscrossing one another to define parallel rows of sharp pointed prongs resisted to the landing or perching of birds thereon.

FIG. 5b is the same as FIG. 5a with the two panels collapsed.

FIG. 6 is a diagrammatic view illustrating a method of assembly.

DETAILED DESCRIPTION OF THE INVENTION

Figure 1:
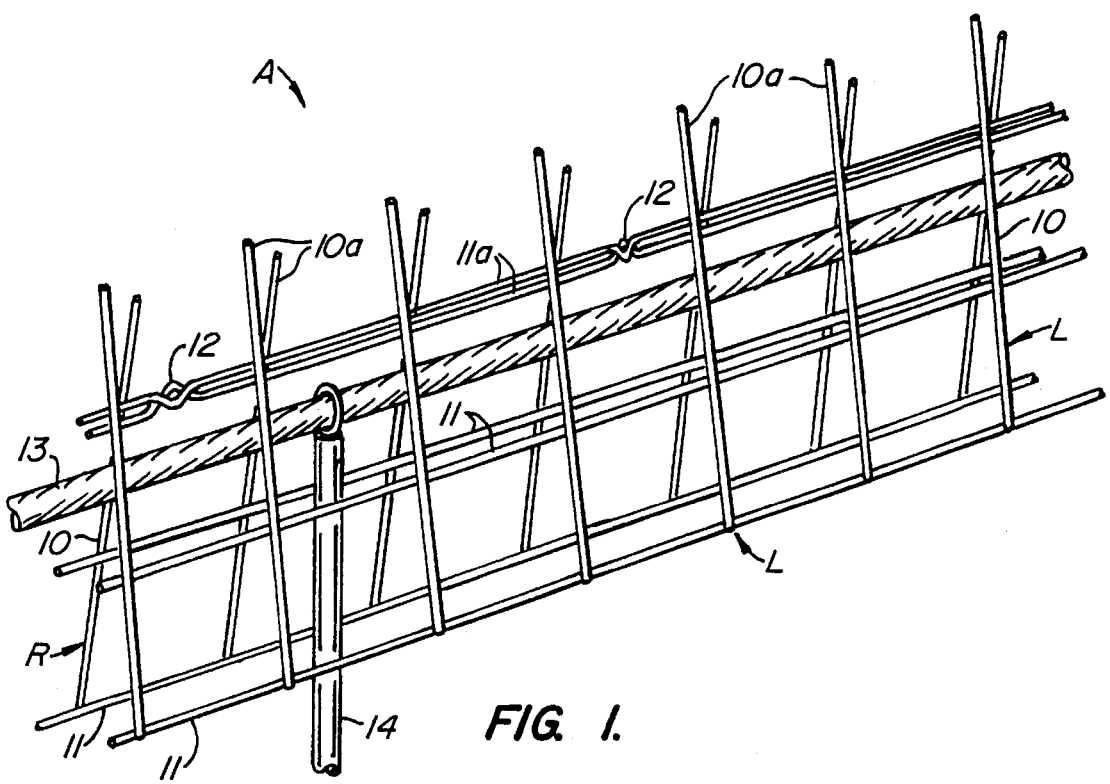
FIG. 1 is a perspective view of an anti-perching unit shown expanded and partially draped over a horizontal round pipe or railing.

Referring now more specifically to the drawings, FIG. 1 discloses two left and right sections or panels of open grid wire fencing-type material indicated generally at L and R, respectively. Each panel or section of open grid material are made up of a plurality of equidistantly spaced vertical strands 10 in combination with equidistantly spaced horizontal strands 11 that are included or otherwise attached at each cross-over point with a vertical strand.

The uppermost or top horizontal strands 11a are twisted tightly together at predetermined spaced points 12 to hingedly connect the panels L and R together in such a manner that the lower portions of the panels can be spread apart for installation as shown in FIG. 1 and FIG. 5a. FIG. 5b shows how the hingedly connected panels can be collapsed into a flat configuration when not in use so that the units can be efficiently and compactly flat-stacked on top of each other for shipping and storage purposes.

FIG. 1 illustrates how a hinged unit can be spread apart and draped over a round cable, wire, narrow railing, water pipe or the like. FIG. 1 shows one of the units partially draped over a horizontal pipe railing supported by one or more vertical posts such as indicated at 14.

By a force of gravity, or application of downward manual pressure, the topmost horizontal wires of the two-panel unit which are hingedly connected at 12 as above stated, will virtually rest in draped position on top of the pipe rail 13. As illustrated in FIG. 1 and FIGS. 5a and 5b when the lower portions of the panel are spread apart the portions of the vertical strands extending above the hingedly attached topmost wires 11a crisscross each other to define two spaced-apart, parallel rows of unsheathed, relatively sharp wire prongs 10a which effectively prevent birds from landing or perching on the substructure (e.g., rail pipe 13) to be protected.

As heretofore mentioned, any number of the units of predetermined length (e.g.,4' long) can be draped over a pipe, cable or wire for any distance required or desired. Adjacent units can be mechanically interlocked to one another simply by draping, and thereby overlapping, the end extremities of one unit over the end extremities of an adjacent unit whereby the upwardly extending prongs will in effect interlock to prevent forward or backward lateral movement between any two panels (not shown).

Further, if the installation is to be temporary—such as protecting birds from landing on boat railings while the boat is anchored or docked, it is unnecessary to crimp or otherwise tightly attach the lower skirt portions of the panels (below the hinge points 12) around the railing, although temporary and easily removable conventional hooks, locking pins or wire ties can be used to temporarily keep the bottom portions of the panels from being accidentally dislodged or removed.

If the installation is to be permanent, then occasional vertical strands of the wire can be tightly crimped around the pipe or substructure or the lower skirt portions of the two panels or the skirt portions can otherwise be tied or locked firmly together by means befitting a permanent installation.

FIG. 3 illustrates how multiple left and right wire panels can be sheared from a standard roll of wire fencing or open rectangular grid-type plastic or wire-like material. Assuming it is desired to make the units in 4' lengths, which is a practical length for handling during installation, as well as for shipping and storing, the fabricator would start with a 4' wide roll of wire grid material of preselected grid opening size and shear it into short lengths of uniform overall panel dimension using a shear or wire cutter 17. The first cut off the roll, as illustrated in FIG. 4, transversely shears the wire just inwardly of the outer cross-wire coming off the roll so that the vertical strands will remain unattached and unsheathed and will eventually, after assembly, become the upwardly extending wire prongs 10a above the hinge line of the unit as described.

Each cut by the shear 17 is made the same manner so as to form identical cut pieces as shown in the stack 18 in FIG. 3. To complete fabrication of the cut pieces 18 into a completed unit, specific reference is made to FIG. 6.

FIG. 6 shows how any two identically cut panel pieces from the stack 18 can be paired and hingedly joined to each other to complete the fabrication steps to produce a final product, as shown in FIG. 1. More specifically, a first panel L (left panel as previously indicated in FIG. 1) and a second panel R (the right panel shown in FIG. 1) are juxtapositioned with the R panel overlying the L panel and with the vertical strands 10 of the R panel being offset half way between the vertical strands of the L panel and with the horizontal wires 11 of the L panel being disposed slightly spaced below, but parallel to corresponding horizontal wires 11 of the R panel. In particular, it will be seen that the top horizontal wires 11a in FIG. 6, being slightly vertically spaced from one another, permits the top wires of both panels to be twisted together or around each other to form the attaching hinge joints 12, thereby completing the fully assembled unit as heretofore described.

Anti-perching units as thus far described can be manufactured inexpensively and in quantity by conventional automated or semi-automated equipment. Units can be fabricated in small quantities by using only hand tools and standard rolls of wire of selected rectangular grid dimension. It has been found that wire fencing or similar grid material having uniform rectangular openings of desired dimensions, such as 2"×4", 3"×4", 4"×4" or 3"×4" can be fabricated into units which, especially in the larger grid size, will effectively prevent any species or size bird that I am aware of from perching on the two rows of prongs 10a—it being understood that with these larger dimensions, the prongs would measure a little under 4" in length so that even birds with long legs would find it either impossible or uncomfortable to land or perch on the upper strands 11a. Specifically, it has been demonstrated that a unit with approximately 3 ½ to 4" prongs embodying the invention will deter perching of sparrows, pigeons, seagulls, and starlings, among others.

Not only can an anti-bird perching unit of the type herein described be employed as a temporary or permanent protector over narrow railings, pipes, cable wires and the like, but said units can be installed quickly and easily as either temporary or permanent bird barriers on flat surfaces, such as window or rooftop ledges on buildings where birds, especially pigeons, are prone to perch with their resultant undesirable droppings. As reflected in FIG. 5a, when the lower portions of the panels L and R are spread apart, the unit can be placed on a flat surface and is self-standing. Thus, if a user wants to temporarily protect against pigeons from perching around the periphery of the roof of a mobile home or recreational vehicle while it is parked, he need only remove as many of the units from a flat storage condition (FIG. 5b) as needed, spread the panels apart, and stand them up along the outside roof line, whereat, at a later time, he can with equal facility and rapidity, remove the units and put them back in flat stacked storage for future use. If a user which wishes to permanently install the units on flat surface, such as building ledges and the like, the bottom wires 11 of each unit which contact the flat surfaces to be covered, provide a readily accessible means for stapling or adhesively gluing (not shown) the units to the underlying flat surface.

Figure 2:
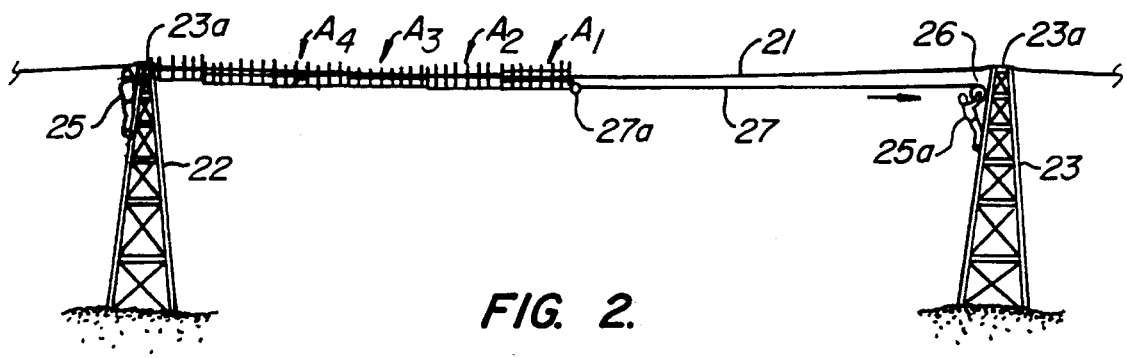
FIG. 2 schematically shows a method of installing a plurality of units on an elevated wire or cable suspended between two towers.

It is observed that electric power utility and telephone companies are frequently confronted with the problem of having an undesirable number of birds perch on the cables or wires that are suspended and anchored to telephone poles or towers, such as schematically illustrated in FIG. 2. It is apparent from FIG. 2 that if need be or desired, the entire length of an elevated span of cable or wire can be protected against perching by draping multiple units over the wire from one end of the span to the other. This could, of course, be accomplished by using a "cherry picker" type hoist to lift a man up to the elevated wire or cable and by moving the cherry picker hoist along the wire span to permit the operator to drape consecutive units over the wire at intervals of every 4' along the wire. However, the need for having to lift an operator up to the wire span at 4' intervals along the wire span to manually place the units thereon is time-consuming and uneconomical at best and, depending on the ground surface or condition below the span (such as a span across a deep ravine, river, or thickly wooded terrain), impossible.

FIG. 2 schematically shows a method of installation of multiple draped units on an elevated span of cable wire, indicated at 21, that spans between two towers 22 and 23 and to which opposite ends of the cable span 21 are anchored in usual fashion as at points 22a and 23a, respectively. FIG. 2 shows how a first operator 25 at the top of the tower 22 can consecutively drape barrier units (A1, A2, A3, A4, etc.) of relatively short length (e.g., 4') on the cable wire 21 and by simply overlapping the ends of adjacent barriers as they are placed on the wire effect a mechanical attachment between all of the consecutively mounted barrier units. As shown schematically in FIG. 2, a second operator 25a located at tower 23 with a winch mechanism 26 can gradually wind up a tow-line 27 (which has been previously mechanically coupled as at 27a to the first mounted unit A1 by the operator 25). Thus, as the first operator 25 consecutively drapes units A1, A2, A3, etc., on the cable with the units mechanically interlocked or coupled to each other, operator 25, by controlling wench 26, can continuously cause the tow-line 27 to pull the entire train of multiple units along so much of the wire span 21 as desired, without either operator having to change locations during the process.

Although it has been found that units fabricated in 4' lengths and out of available standard-sized wire fencing type material defining rectangular grid openings, such as 3"×4" with 16–18 gauge wire of galvanized or coated wire material, it is understood that units can be custom made by any number of known manufacturing methods out of any desirable metal or plastic wire or ribbon-type material. The hinges can be made and applied separately as desired. Further, the length of the depending panel skirts can be varied according to particular installations aesthetic considerations or particular circumstances of any given application.

Although the present invention has been described in some detail by way of illustration and example, it is understood that various modifications may be made within the skill of the art without departing from spirit of the invention or scope of the appended claims.

What is claimed is:

1. An anti-bird perching device for mounting to a horizontal cable or railing to be protected, comprising:

right and left panels formed of an open grid material including equally spaced, vertically disposed, parallel strands extending from top to bottom margins of said grid panels, and further including equally spaced horizontally disposed strands extending from one side to an opposite side of said panels, hinge means mounting said grid panels in substantially face-to-face parallel relationship, with the vertical strands of the left panel being horizontally offset from the vertical strands of the right panel, said hinge means formed by twisting topmost horizontal strands on opposed panels together at horizontally preselect spaced points, upper portions of the vertical strands of both the left and right panels located above said hinge mounting means defining individual anti-bird perching prongs, the grid material located below such hinge means defining lower skirt panels hingedly movable toward and away from one another whereby said lower skirt panels can be manually spread apart to permit said skirt panels to be draped over a horizontal cable or railing to cause said prongs of opposite panels located above said hinge means to move in opposite directions and crisscross over one another to form two parallel rows of said prongs.

2. A device according to claim 1 and wherein said hinge means permits the lower skirt panels to be closed toward one another to collapse the panels in substantially flat and compact position.

3. A method of deterring birds from perching on suspended spans of relatively elongate narrow structures, including narrow railings, wire cables, and pipes, including the steps of:

providing a plurality of an anti-bird perching units each of preselected length having an upper surface defining a pronged surface to deter birds from landing or perching thereon, slidably mounting a first and leading anti-perch unit on an elongate relatively narrow structure at a first location adjacent said narrow structure, consecutively mounting on said structure one unit at a time behind the first mounted leading unit and mechanically coupling each unit at its opposite ends to each adjacent unit to form a continuous train of mounted and coupled units, simultaneously causing the first mounted leading unit to slidably move longitudinally along said structure an incremental distance equal to the preselected length of each unit as it is consecutively mounted and added to the train to protectively cover said structure a preselected distance along its span to protect it from birds perching thereon.

4. A method according to claim 3 including the step of attaching a towline to the first mounted leading unit and exerting a pulling force thereon to cause the entire train of units to slidably move along the length of the structure.

5. The method of claim 4 and including the step of winching the towline attached to the train along said structure from a second location downstream from the first location at the same rate of incremental slidable movement as the rate of which the units from the first location are mounted consecutively on the structure from the first location.

* * * * *